United States Patent [19]

Takahashi

[11] Patent Number: 4,639,742

[45] Date of Patent: Jan. 27, 1987

[54] METHOD AND APPARATUS FOR PRINTING AN IMAGE

[75] Inventor: Tomohiko Takahashi, Tokyo, Japan

[73] Assignee: Kabushiki Kaisha Toshiba, Kanagawa, Japan

[21] Appl. No.: 779,064

[22] Filed: Sep. 23, 1985

[30] Foreign Application Priority Data

Oct. 8, 1984 [JP] Japan ................................ 59-210915

[51] Int. Cl.[4] ............................................ G01D 15/10

[52] U.S. Cl. ............................... 346/76 PH; 346/106; 358/298; 400/120

[58] Field of Search ................ 346/76 PH, 76 R, 106; 400/120, 240.3; 219/216 PH; 358/298

[56] References Cited

U.S. PATENT DOCUMENTS 2,616,961 11/1952 Groak .............................. 346/76 R 4,527,171 7/1985 Takahashi et al. .................. 346/105

*Primary Examiner*—Arthur G. Evans

*Attorney, Agent, or Firm*—Schwartz, Jeffery, Schwaab, Mack, Blumenthal & Evans

[57] ABSTRACT

A thermal printer comprises a thermal printing head to heat an ink ribbon overlapping a printing sheet. The ink ribbon is coated with thermally transferable colorants and transfer ratio regulating materials. First, the transfer ratio regulating materials are transferred onto the printing sheet by heating the ink ribbon, and then the colorants are transferred according to an image to be printed. The colorants are thus thermally transferred onto the printing sheet in accordance with the amount and range of transferred regulating materials. The material operates to reduce or promote the transfer of colorants. Thus, a multi-gradation expression of the printed image may be achieved by changing the transferred amount of the transfer rate regulating materials.

19 Claims, 10 Drawing Figures

METHOD AND APPARATUS FOR PRINTING AN IMAGE

BACKGROUND OF THE INVENTION

This invention relates to a method and apparatus for printing an image and, more specifically, relates to a method for expressing gradation in thermal transfer printing and an apparatus using the method.

As an example of a thermal printing apparatus, there is known a color copying machine of the thermal transfer type which reproduces a color image by using thermal transfer ink ribbons having a plurality of colorants. In a conventional apparatus of this kind, the ink ribbons are positioned opposite a copy paper, and are heated selectively by a thermal printing head having a plurality of heating elements. In operation, the heating elements are energized according to the image to be printed, whereby the colorants are transferred to the copy paper to form the image. Examples of such prior art machines are shown, for example, in U.S. Pat. Nos. 4,067,017; 4,378,566; and 4,427,985, and European Patent Application No. 0,050,481.

In the printing apparatus mentioned above, however, as all the colorants have the same melting point, the apparatus may not be utilized to obtain an intermediate tone or sufficient gradation. It is, therefore, known to achieve gradations in the hard copy by controlling the image density by varying the driving time period of the heating elements, or by controlling the image density of printed dots by varying the number of driven heating elements assigned to form a picture element. However, the relationship between the image density of the printed image and the driving time period of the heating elements is not linear. Thus, if a smooth gradation is to be achieved by varying the driving time period, complicated conditions must be met. Further, one picture element is defined by a plurality of recording dots. Therefore, the resolution of the printed image deteriorates when a smooth gradation is obtained by varying the number of driven heating elements. To reduce this deterioration, the number of heating elements defining one picture element could be increased, if desired. However, the density of heating elements should be limited to 16 elements/mm due to manufacturing considerations. Therefore, a need has arisen for a method and apparatus for achieving a smooth gradation without producing a deterioration in resolution by using a low density arrangement of heating elements.

SUMMARY OF THE INVENTION

Accordingly, it is an object of the present invention to provide an improved method and apparatus for printing an image.

Another object of the present invention is to provide a method and apparatus for printing an image in which a smooth gradation is achieved.

These and other objects are achieved by providing an improved apparatus for printing an image on a recording medium including means for holding the recording medium opposite an ink donor sheet which has a first portion provided with a colorant capable of being transferred onto the recording medium to print the image and a second portion provided with a transfer ratio regulating material capable of being transferred onto the recording medium to regulate the amount of transfer of the colorant onto the recording medium, means for transferring the colorant and transfer ratio regulating material onto the recording medium, and means for disposing the ink donor sheet so that the recording medium overlaps the second portion to transfer the transfer ratio regulating material and then overlaps the first portion to form the image on the surface of the recording medium having the transfer ratio regulating material tranferred thereon.

In another aspect of the present invention, the above objects are achieved by providing an improved method of printing an image on a recording medium using an ink donor sheet having a colorant capable of being transferred onto the recording medium and a transfer ratio regulating material capable of being transferred onto the recording medium to regulate the amount of transfer of the colorant onto the recording medium comprising the steps of disposing the recording medium opposite to the ink donor sheet, transferring the transfer ratio regulating material onto the recording medium, and transferring the colorant onto the recording material having the transfer ratio regulating material transferred thereon to form the image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which.

DETAILED DESCRIPTION OF THE PREFERRED EMBODIMENTS

Figure 1:
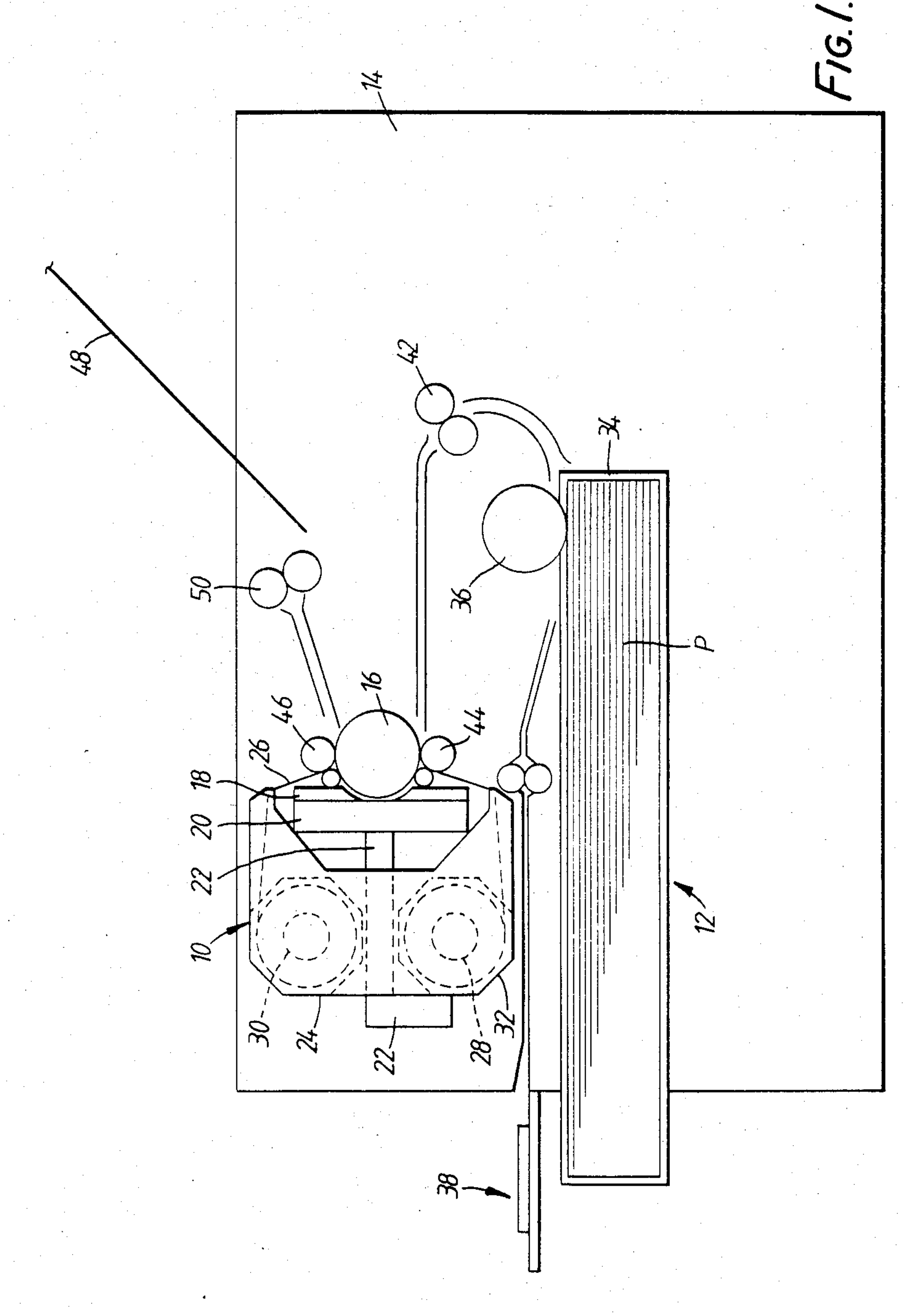
FIG. 1 is a front view of the inside of a thermal printer according to the present invention.

FIG. 1 shows the thermal printer for printing an image on a recording medium according to the present invention.

Referring now to FIG. 1, the thermal printer comprises a printer unit 10 and a feeder unit 12 which are enclosed in a casing 14. A platen roller 16 is horizontally attached in the central portion of printer unit 10. A thermal head 18 is attached on the front side of platen roller 16. Thermal head 18 is secured on a radiator 20 integrally formed on a rear end surface of a holder 22. A ribbon cassette 24, which encloses a thermal transfer ink ribbon 26, is detachably installed in holder 22 through a cassette exchange port (not shown). When ribbon cassette 24 is installed in holder 22, thermal transfer ink ribbon 26 is interposed between thermal head 18 and platen roller 16. Ribbon cassette 24 comprises a supply reel 28 and a take-up reel 30 to which the ends of the ink ribbon are respectively connected, and a casing 32. A portion of casing 32 is opened so that thermal transfer ink ribbon 26 is interposed between platen roller 16 and thermal head 18. When ribbon cassette 24 is installed in printer unit 10, supply reel 28 and take-up reel 30 are coupled to a drive shaft of a motor (not shown) to carry ink ribbon 26, and are rotated. A paper feed cassette 34, in which copy papers P are stored, is positioned below platen roller 16. Copy papers P in cassette 34 are picked up one-by-one due to the rotation of a feed roller 36 provided beneath and to the right (in FIG. 1) of platen roller 16. Feeder unit 12 is also provided with a manual feed table 38. This table 38 may supply copy paper P to printer unit 10 through a guide passage 40. Copy paper P, taken from cassette 34 or supplied from table 38, is aligned by a pair of rollers 42 provided above and to the right (in FIG. 1) of feed roller 36. Thereafter, copy paper P is carried toward platen roller 16. Two press rollers 44 and 46 come into pressure contact with platen roller 16. Copy paper P is wrapped around platen roller 16 by rollers 44 and 46, whereby copy paper P is accurately set in a predetermined position for transportation. When copy paper P is received between thermal head 18 and platen roller 16, the ink coated on ink ribbon 26 is transferred from ribbon 26 onto paper P due to the heat selectively radiated from thermal head 18, whereby copy images are formed on paper P. The ink transfer operation may be repeated, if desired. Thereafter, copy paper P is discharged onto a tray 48 through a paper discharge roller 50. Paper feed cassette 34 may be freely attached to and detached from feeder unit 12 through the front surface thereof. In addition, table 38 permits the manual feed of paper P by hand one at a time.

Thermal head 18 comprises a heating element array and a driving circuit, which are integrally disposed on a ceramic substrate (not shown). The heating element array is arranged in a horizontal line across the direction of transport of paper P, and provided with a plurality of heating elements (not shown). Each of these heating elements is adapted to print one picture element, i.e., a printing dot, and is divided into a plurality of heating segments (not shown). These heating segments are connected to the driving circuit, so that the selected heating segments are activated to heat ink ribbon 26 according to the image. By changing the number of heating elements activated by the driving circuit, the image density of the printed image may be established, and the heated area in the heating elements, i.e., the picture elements for defining the printed image, change according to the activated heating segments.

The principle of the thermal transfer printing will now be described. When copy paper P supplied from rollers 42 is received between platen roller 16 and ink ribbon 26, thermal head 18 presses copy paper P onto platen roller 16 through ink ribbon 26, and at the same time, the heating element array is selectively activated in accordance with image signals. The ink as a colorant coated on ink ribbon 26 is melted and is thermally transferred onto copy paper P on a line-by-line basis to form the image.

Figure 2:
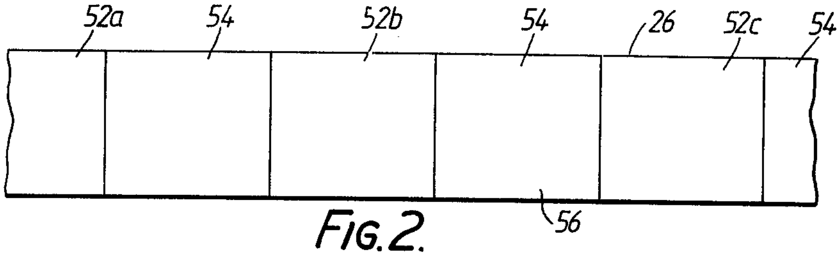
FIG. 2 is a plan view of an ink donor sheet used for the thermal printer shown in FIG. 1.

Referring now to FIG. 2, ink ribbon 26 is provided with three different portions having colorants **52*a*, 52*b* and 52*c*, and portions having transfer ratio regulating materials 54 interposed between adjacent colorant portions. These colorants 52*a*, 52*b* and 52*c* may be yellow, magenta and cyan inks, respectively, which are thermally fusible or thermally sublimable. The material 54 operates to regulate the transfer ratio of the ink onto copy paper P, for example, silicone or wax may be used. When a portion of the paper P is coated with silicone, it operates to reduce the transfer ratio of the ink onto copy paper P. When a portion of the copy paper P is coated with wax, it operates to increase the transfer of the ink onto copy paper P. Ink ribbon or ink donor sheet 26 comprises a base sheet 56, for example, a polyester sheet with a thickness of 6 μm. On base sheet 56**, cyan, magenta and yellow thermal sensitive colorants are coated as thin layers.

In operation, copy paper P overlaps sheet 56 so that the transfer ratio regulating material, for example, silicone, is transferred onto the copy paper by the heat of thermal head 16. Then, copy paper P overlaps ink donor sheet 26 so that the ink is transferred onto copy paper P to form the image. Namely, the ink is transferred onto the surface of copy paper P, on which silicone is previously coated. The transfer amount of silicone is determined by the temperature and the number of the activated heating elements or the repeat times of the step of transferring silicone onto copy paper P. When a large quantity of silicone is previously deposited on the surface of paper P, the ink will be only slightly transferred onto copy paper P.

Figure 3A:
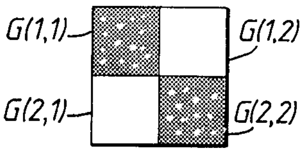
FIGS. 3(*a*) and 3(*b*) are illustrations for explaining a method of expressing gradation.
Figure 3B:
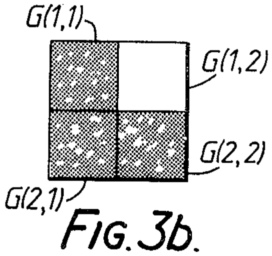

Referring now to FIGS. 3(*a*) and (*b*), for example, one picture element is defined as a 2×2 matrix which comprises four printing dots according to heating segments G(1,1), G(1,2), G(2,1) and G(2,2). When heating elements G(1,1) and G(2,2) are activated as shown in FIG. 3(*a*), or heating segments G(1,1), G(2,1) and G(2,2) are activated as shown in FIG. 3(*b*), the image density of the picture element depends on the number of the activated heating segments, i.e., the number of printed dots. Moreover, as shown in FIGS. 3(*a*) and (*b*), there are areas where the ink is transferred and another area where the ink is prevented from transferring by the transfer ratio regulating materials, i.e., silicone deposited on copy paper P in a printed area (solid area) according to the activated heating segments.

Figure 4A:
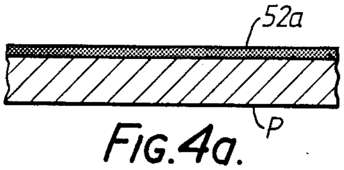
FIGS. 4(*a*), 4(*b*) and 4(*c*) are sectional views for showing the state of transferred colorants according to the present invention.
Figure 5A:
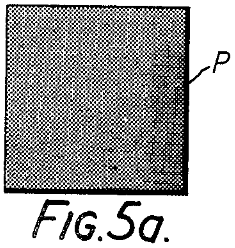
FIGS. 5(*a*), 5(*b*) and 5(*c*) are enlarged plan views for showing the state of transferred colorants according to the present invention.
Figure 4B:
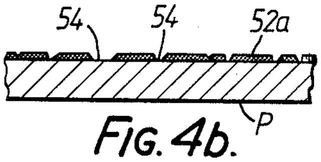
Figure 5B:
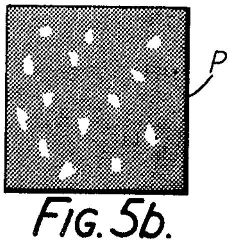
Figure 4C:
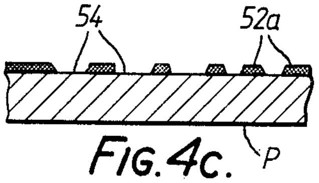
Figure 5C:
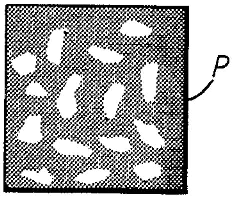

As shown in FIGS. 4(*a*) and 5(*a*), the ink is transferred uniformly as an image onto copy sheet P when only the ink is transferred without a transfer of silicone. When silicone is slightly transferred onto copy paper P ahead of the ink transfer, the image density is slightly reduced as shown in FIGS. 4(*b*) and 5(*b*). In this case, the ink is hardly transferred due to silicone previously deposited on the surface of paper P. In accordance with the amount of silicone deposited on paper P, the image density is further reduced, as shown in FIGS. 4(*c*) and 5(*c*).

In the above description, the transfer ratio regulating material operates so as to reduce the image density, i.e., the transfer ratio. However, the same effects may be achieved by using wax or the like to promote the ink transfer. In this case, with an increase of the amount of wax, the image density is increased from the state as shown in FIGS. 4(*c*) and 5(*c*), which is the converse of the case of the above embodiment.

In operation, a set of image data representing a dot pattern of an image to be printed and the gradation of the dot pattern is provided to the driving circuit for each printing line. Then, the motor rotates take-up reel 30, whereby a portion having transfer rate regulating material 54 is positioned opposite the surface of copy paper P. Then, thermal head 18 operates to heat ink ribbon 26 to transfer the material 54 onto copy paper P according to the gradation data of the dot pattern. As a result, the material 54 coated on ink ribbon 26 is transferred onto paper P supported by platen roller 16. At this time, ink ribbon 26 and paper P overlap each other and are transported on a line-by-line basis. After that, paper P is transported backwards by platen roller 16, so that paper P overlaps the ink coated portion having colorant 52a, 52b or 52c. Then, thermal head 18 is operated so as to activate the heating segments according to the dot pattern. As a result, the colorants coated on ink ribbon 26 are transferred to paper P, on which the transfer rate regulating material has been previously coated. The amount of transferred colorants depends on the amount and distribution of the transfer rate regulating material.

According to the present invention, a smooth gradation may be obtained by changing the amount of coated transfer rate regulating material. That is, even with a thermal head employing a low density arrangement of heating segments, the density of printed dots may be varied to produce a plurality of density levels. Thus, a multi-value gradation method may be utilized without decreasing resolution.

Further, colorants and transfer rate regulating materials are alternately disposed on the same ink ribbon, so that the step of transferring the materials and the step of transferring the colorants may be carried out in order by moving the ink ribbon.

Numerous modifications and variations of the present invention are possible in light of the above teachings. It is, therefore, to be understood that within the scope of the appended claims, the invention may be practiced otherwise than as specifically described herein.

What is claimed is:

1. An apparatus for printing an image on a recording medium comprising:

means for holding the recording medium opposite to an ink donor sheet, said ink donor sheet having a first portion provided with a colorant capable of being transferred onto the recording medium to print the image and a second portion provided with a transfer ratio regulating material capable of being transferred onto the recording medium to achieve a predetermined gradation pattern of the printed image by changing the amount of transfer of said colorant onto the recording medium;

means for transferring said colorant and said transfer ratio regulating material onto the recording medium held by said holding means in accordance with a predetermined gradation pattern; and means for disposing said ink donor sheet so that the recording medium overlaps said second portion to transfer said transfer ratio regulating material in accordance with the gradation pattern of the image to be printed on the recording medium and then overlaps said first portion to form the image on the surface of the recording medium having said transfer ratio regulating material transferred thereon.

2. An apparatus as claimed in claim 1, wherein said transfer ratio regulating material operates to reduce the amount of transfer of said colorant onto the recording medium.

3. An apparatus as claimed in claim 2, wherein said transfer ratio regulating material comprises silicone.

4. An apparatus as claimed in claim 1, wherein said transfer ratio regulating material operates to promote the amount of transfer of said colorant onto the recording medium.

5. An apparatus as claimed in claim 4, wherein said transfer ratio regulating material comprises wax.

6. An apparatus as claimed in claim 1, wherein said first and second portions are arranged alternately on said ink donor sheet.

7. An apparatus as claimed in claim 1, wherein said holding means includes a rotating platen roller.

8. An apparatus as claimed in claim 1, wherein said transferring means includes a thermal printing head.

9. An apparatus as claimed in claim 8, wherein said colorant and transfer ratio regulating material are thermofusible or thermo-sublimating.

10. A method of printing an image on a recording medium using an ink donor sheet having a colorant capable of being transferred onto the recording medium and a transfer ratio regulating material capable of being transferred onto the recording medium to achieve a predetermined gradation pattern in the printed image by changing the amount of transfer of said colorant onto the recording medium, said method comprising the steps of:

(a) disposing the recording medium opposite to said ink donor sheet;

(b) transferring said transfer ratio regulating material onto the recording medium in accordance with the gradation pattern of the image to be printed; and (c) transferring said colorant onto the recording medium having said transfer ratio regulating material transferred thereon to form the image in accordance with said gradation pattern.

11. A method as claimed in claim 10 including repeating said step (b) so as to change the transfer ratio.

12. A method as claimed in claim 10 including heating said ink donor sheet to transfer said colorant and transfer ratio regulating material onto the recording medium.

13. A method as claimed in claim 12, wherein said colorant and transfer ratio regulating material are thermofusible or thermo-sublimating.

14. A method as claimed in claim 10, wherein said transfer ratio regulating material operates to reduce the amount of transfer of said colorant onto the recording medium.

15. A method as claimed in claim 14, wherein said transfer ratio regulating material includes silicone.

16. A method as claimed in claim 10, wherein said transfer ratio regulating material operates to increase the amount of transfer of said colorant onto the recording medium.

17. A method as claimed in claim 16, wherein said transfer ratio regulating material includes wax.

18. A method as claimed in claim 10, wherein a first portion coated with said colorant and a second portion coated with said transfer ratio regulating material are arranged alternately on said ink donor sheet.

19. A method as claimed in claim 10 further comprising the step of moving said ink donor sheet and the recording medium relative to each other after the completion of said step (b).

* * * * *